United States Patent
Imamura

(10) Patent No.: US 6,741,459 B2
(45) Date of Patent: May 25, 2004

(54) ELECTRONIC APPARATUS HAVING A MAIN BODY ON WHICH A DISPLAY DEVICE IS PLACED

(75) Inventor: Akira Imamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 09/954,032

(22) Filed: Sep. 18, 2001

(65) Prior Publication Data

US 2002/0034065 A1 Mar. 21, 2002

(30) Foreign Application Priority Data

Sep. 18, 2000 (JP) .................................... 2000-281772

(51) Int. Cl.⁷ .............................................. G06F 1/16
(52) U.S. Cl. ..................... 361/683; 361/686; 361/724
(58) Field of Search ................. 361/679–686, 361/724–727

(56) References Cited

U.S. PATENT DOCUMENTS 5,648,762 A * 7/1997 Ichimura et al. ....... 340/825.31
6,052,277 A   4/2000 Liu et al.

FOREIGN PATENT DOCUMENTS

| JP | 52-164406 | 12/1977 |
|----|-----------|---------|
| JP | 59-159591 | 10/1984 |
| JP | 62-142882 | 9/1987 |
| JP | 63-100885 | 6/1988 |
| JP | 63-164288 | 10/1988 |
| JP | 5-71921 | 9/1993 |
| JP | 08-161874 | 6/1996 |
| JP | 10-207575 | 8/1998 |
| JP | 11-65707 | 3/1999 |
| TW | 341426 | 9/1998 |

* cited by examiner

Primary Examiner—Darren Schuberg
Assistant Examiner—Yean Hsi Chang
(74) Attorney, Agent, or Firm—Finnegan, Henderson, Farabow, Garrett & Dunner, L.L.P.

(57) ABSTRACT

An electronic apparatus comprises a display device and a main body that has a plurality of function parts, such as a control circuit module and a power unit, built-in. The main body includes a cover in the form of a hollow box, having a top plate on which the display device is placed, and a frame held inside the cover so as to be able to be drawn out of the cover and supporting the function parts. The cover has a strength such that it can maintain the shape of a box even when the display device is placed on the top plate.

19 Claims, 9 Drawing Sheets

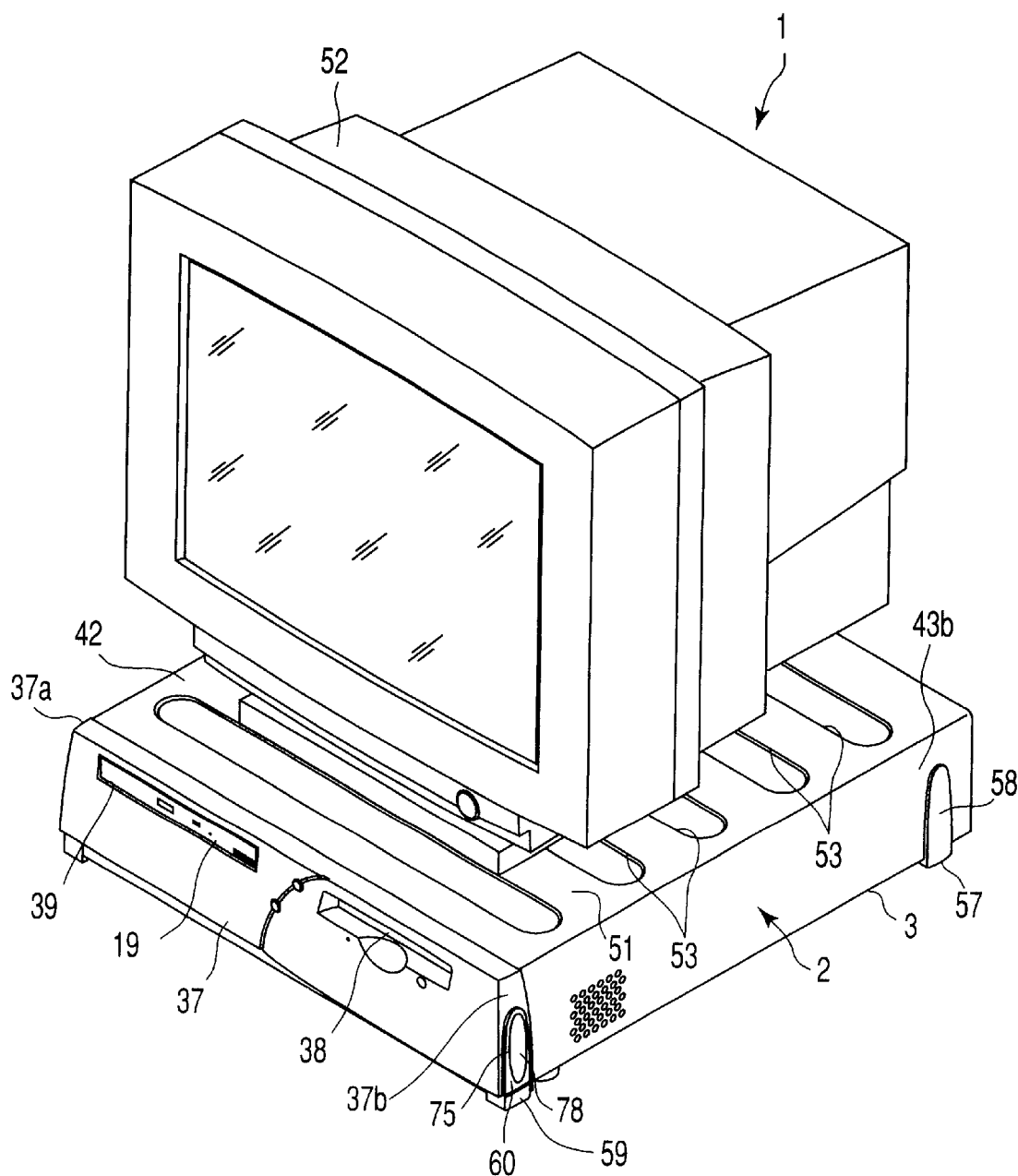
F I G. 1

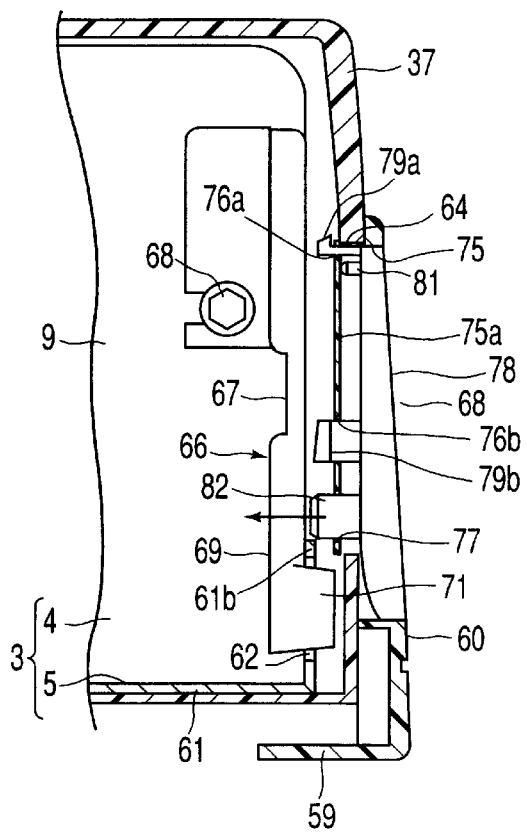
FIG. 11
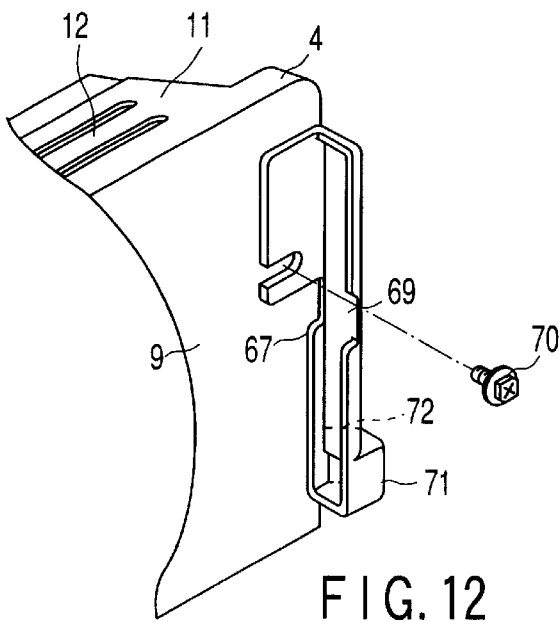
FIG. 12
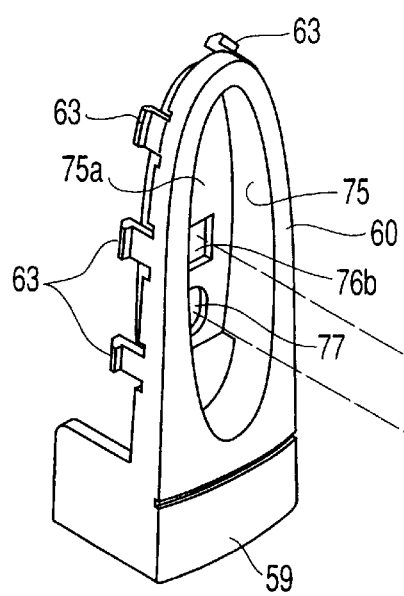
FIG. 13
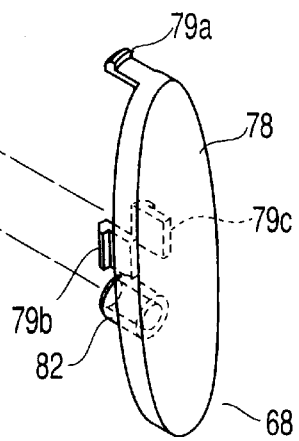

ELECTRONIC APPARATUS HAVING A MAIN BODY ON WHICH A DISPLAY DEVICE IS PLACED

CROSS-REFERENCE TO RELATED APPLICATIONS

This application is based upon and claims the benefit of priority from the prior Japanese Patent Application No. 2000-281772, filed Sep. 18, 2000, the entire contents of which are incorporated herein by reference.

BACKGROUND OF THE INVENTION

1. Field of the Invention

The present invention relates to an electronic apparatus such as a desktop personal computer, and more particularly, to the construction of a main body having therein function parts, such as a power unit and a system substrate mounted with a CPU.

2. Description of the Related Art

A desktop personal computer comprises a main body placed on a desk and a display device connected electrically to the main body. The main body includes a housing in the form of a rectangular box. Principal function parts, such as a system substrate mounted with a CPU, hard disk drive, CD-ROM drive, and power unit, are collectively held in the housing.

The housing includes a chassis and a top cover that spreads over the chassis. The chassis is a steel sheet formed by sheet metal stamping. The function parts including the system substrate and accessories are supported on the chassis. The top cover includes a top plate and left- and right-hand side plates, and is removably screwed to the chassis. In carrying out maintenance operation for the main body or expanding the functions of the system substrate, therefore, the top cover must be removed from the chassis so that the function parts supported on the chassis are exposed to the outside of the housing.

If the main body and the display device of the desktop personal computer are arranged side by side on the desk, the working space over the desk is narrowed. In many cases, therefore, the display device is placed on the top plate of the housing.

If the display device is left on the top plate of the housing, according to this arrangement for use, it hinders the top cover from being removed from the chassis. In carrying out a maintenance operation for the main body, for example, therefore, the display device must be moved from the position on the top plate to another place. If the display device is a CRT display device that is heavy and bulky, in particular, its movement takes much time and labor, and it is necessary to secure a wide space around the main body in which the CRT display device can be placed temporarily. Thus, preparations must be made before the maintenance of the main body is started, which slows down work.

Described in Jpn. Pat. Appln. KOKAI Publication No. 10-207575 is an arrangement that facilitates the maintenance of a control element, such as a system substrate, in a relatively large-scale computer system for business use. A housing according to this prior art includes outer and inner housings. The outer housing is designed so that it can support another housing on its top. The inner housing is supported so that it can be loaded into and unloaded from the outer housing. The inner housing contains the control element of the computer system therein. Thus, the control element can be exposed to the outside of the housing merely by drawing out the inner housing from the outer housing.

According to the prior art described above, the additional housing that is put on the housing having the control element built-in is a simple general-purpose cabinet of a drawer type. The general-purpose cabinet of this type is relatively light in weight, so that no substantial load acts on the outer housing that supports the cabinet from below. In other words, according to the aforesaid prior art, a heavy bulky article, such as the CRT display device, is not supposed to be placed on the housing. If the CRT display device is placed on the outer housing, therefore, the top face of the outer housing may possibly be deformed or warped downwards.

Thus, the position of the CRT display device may become unstable, or the deformation of the outer housing may prevent the inner housing from being drawn out smoothly.

According to the prior art described above, moreover, slide rails are attached to the inner surface of the outer housing and the outer surface of the inner housing, individually. The inner housing is slidable along the slide rails.

However, this arrangement requires use of dedicated slide rails for sliding the inner housing, and the number of indispensable parts increases correspondingly. Besides, the slide rails must be expressly attached to the inner and outer housings, which raises the manufacturing cost of the housing.

BRIEF SUMMARY OF THE INVENTION

The present invention has been contrived in consideration of these circumstances, and its object is to provide an electronic apparatus designed so that function parts inside a cover can be exposed to the outside of a main body without moving a heavy bulky article, such as a display device, if any, off the cover, so that maintenance or expansion of the function parts can be carried out with ease.

In order to achieve the above object, an electronic apparatus according to a first aspect of the present invention comprises an external device and a main body having a plurality of function parts built-in. The main body includes a cover in the form of a hollow box, having a top plate on which the external device is placed, and a frame held inside the cover so as to be drawn out of the cover and supporting the function parts. The cover having strength such that the cover maintains the shape of a box even when the external device is placed on the top plate.

In order to achieve the above object, an electronic apparatus according to a second aspect of the invention comprises a main body having a plurality of function parts built-in, the main body including a cover in the form of a hollow box, having a bottom plate, a top plate on which an article is placed, and a pair of upright plates extending between the bottom plate and the top plate, and a frame held inside the cover so as to be drawn out of the cover and supporting the function parts. The cover has strength such that the cover maintains the shape of a box even when the article is placed on the top plate, and the frame is slidably supported by means of the bottom plate and the upright plates of the cover.

In order to achieve the above object, an electronic apparatus according to a third aspect of the invention comprises a main body having a plurality of function parts built-in, the main body including a cover in the form of a hollow box, having a top plate on which an article is placed and an opening at one end thereof, and a frame held inside the cover, being drawn out of the cover through the opening, and supporting the function parts, the cover having strength such that the cover maintains the shape of a box even when the article is placed on the top plate, and a latch device for holding the frame inside the cover, the latch device being adapted to be releasably caught by the cover when the frame is held inside the cover.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of a desktop personal computer according to an embodiment of the present invention;

FIG. 3 is a perspective view of a frame having the function parts built-in;

FIG. 11 is a sectional view of a latch device;

FIG. 12 is a perspective view showing a latch piece attached to a front plate of the frame;

FIG. 13 is an exploded perspective view of a release mechanism of the latch device;

DETAILED DESCRIPTION OF THE INVENTION

A desktop personal computer according to an embodiment of the present invention will now be described with reference to the accompanying drawings.

FIG. 1 shows a desktop personal computer 1. The personal computer 1 has a main body 2. The main body 2 includes a housing 3 that can be placed on a desk, for example.

Figure 2:
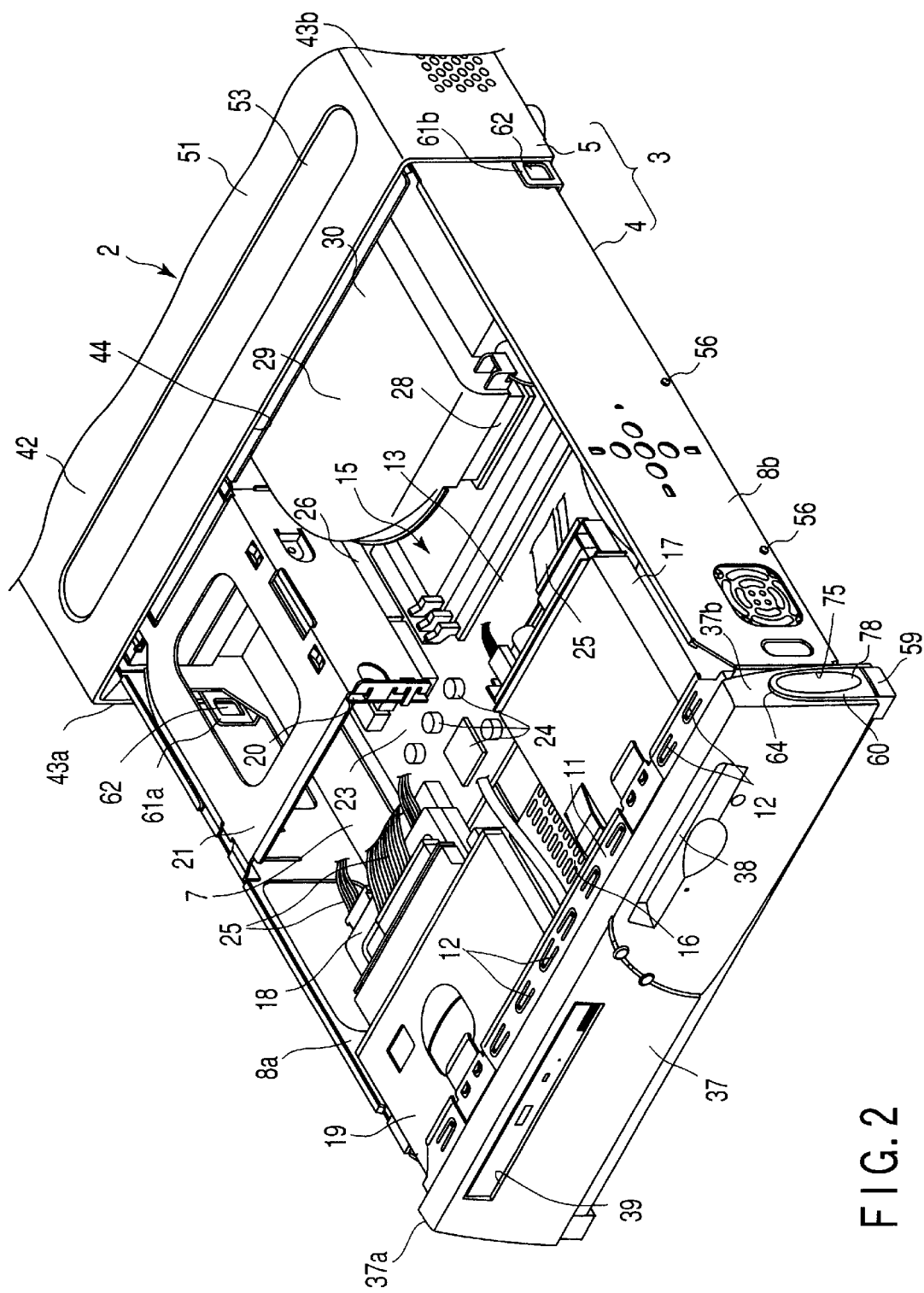
FIG. 2 is a perspective view of a main body showing a state in which a frame is drawn out of a cover so that function parts are exposed to the outside of a housing.

As shown in FIG. 2, the housing 3 includes a frame 4 and a cover 5 that holds the frame 4 in a removable manner. The frame 4 is formed of a pressed part of a steel sheet with a thickness of about 1 mm, for example. The frame 4 integrally includes a flat base plate 7, a pair of side plates 8a and 8b that extend upward from the left- and right-hand side edge portions, respectively, of the base plate 7, a front plate 9 (shown in FIG. 12) that extends upward from the front edge of the base plate 7, and a rear plate 10 (shown in FIG. 6) that extends upward from the rear edge of the base plate 7. The respective front and rear ends of the side plates 8a and 8b are coupled to the front and rear plates 9 and 10, respectively, by spot welding. Thus, the frame 4 is in the form of an open-topped box.

The front plate 9 of the frame 4 includes a flange portion 11 that is bent backward at right angles to its upper edge portion. The flange portion 11 extends in the width direction of the frame 4. A large number of elastically deformable contacts 12 are formed on the flange portion 11.

Figure 3:
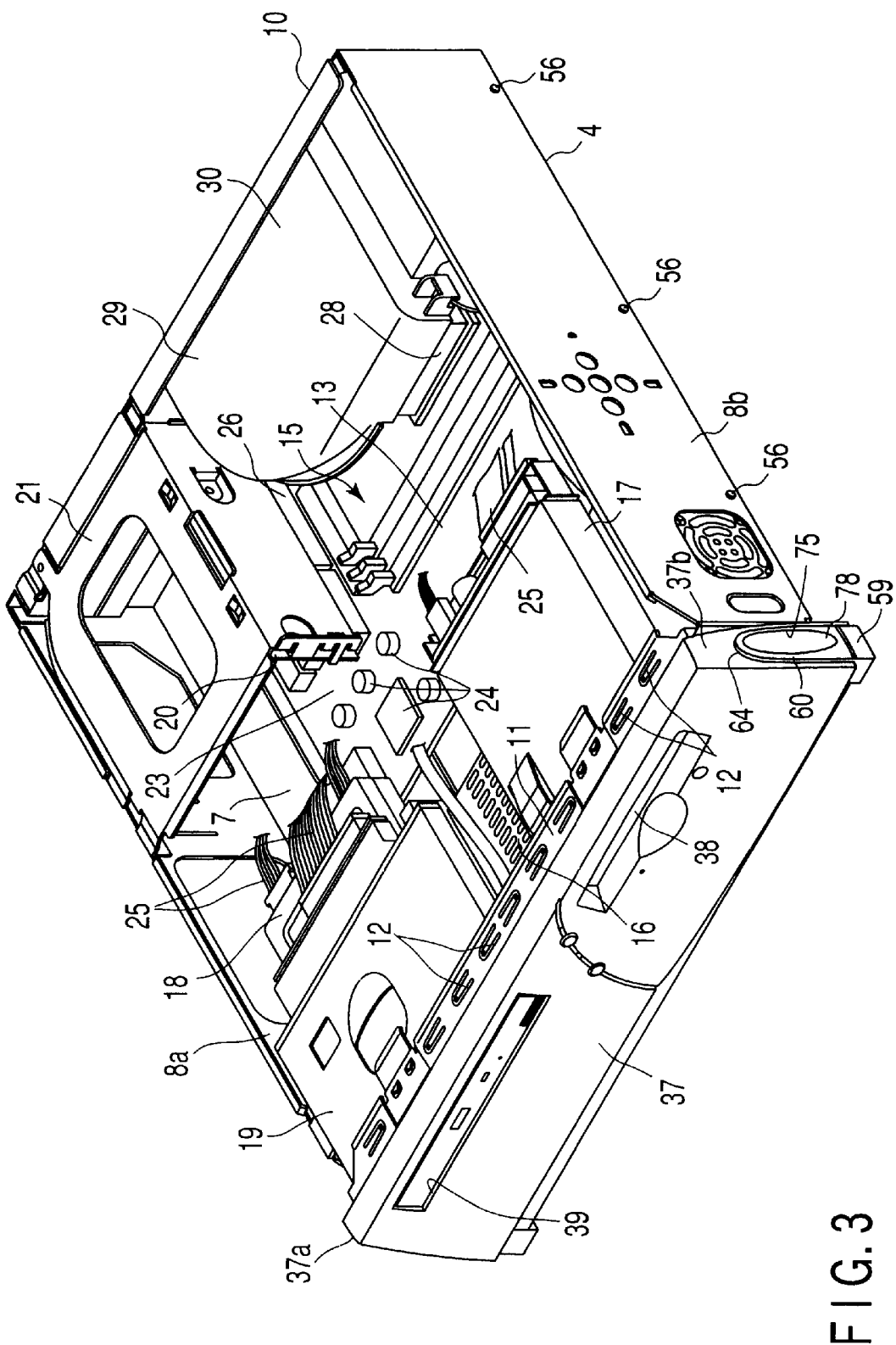

As seen from FIG. 3, the frame 4 has a mounting region 13 on its base plate 7. The mounting region 13 is defined by a space that is surrounded by the base plate 7, side plates 8a and 8b, front plate 9, and rear plate 10. The mounting region 13 contains therein a plurality of function parts, such as a control circuit module 15, power unit 16, floppy disk drive 17, hard disk drive 18, CD-ROM drive 19, and support card 20 for expanded functions.

The control circuit module 15 is situated in the rear half of the mounting region 13. The module 15 includes a system substrate 23 and a large number of circuit components 24 mounted on the substrate 23. The system substrate 23 is screwed to the base plate 7 and located horizontally along the base plate 7.

The power unit 16 and the floppy disk drive 17 are stacked vertically in layers at the right-hand end portion of the front half of the mounting region 13. The hard disk drive 18 and CD-ROM drive 19 are stacked vertically in layers at the left-hand end portion of the front half of the mounting region 13. The power unit 16, floppy disk drive 17, hard disk drive 18, and CD-ROM drive 19 are removably supported in the frame 4, and are connected electrically to the system substrate 23 by means of cables 25, individually.

The support card 20 for expanded functions is used to increase the number of available PCI cards. This card 20 is screwed to a bracket 21, which is removably supported on the frame 4 at the left-hand end portion of the rear half of the mounting region 13. The card 20 is set upright on the system substrate 23 at right angles to it. A terminal area (not shown) at the lower end of the card 20 is connected to a connector 26 on the system substrate 23.

The system substrate 23 carries thereon a heat sink 28, which is thermally connected to a CPU (not shown), and a cooling unit 29 for compulsorily cooling the sink 28. The cooling unit 29 is situated on the right of the bracket 21 and includes an exhaust duct 30 that has a motor fan (not shown) built-in. The upstream end of the exhaust duct 30 faces the upper surface of the heat sink 28. The downstream end of the duct 30 connects with a large number of exhaust ports 31 (shown in FIG. 6) that open in the rear plate 10 of the frame 4. The exhaust ports 31 are arranged in the width direction of the frame 4 at the upper end portion of the rear plate 10.

Figure 6:
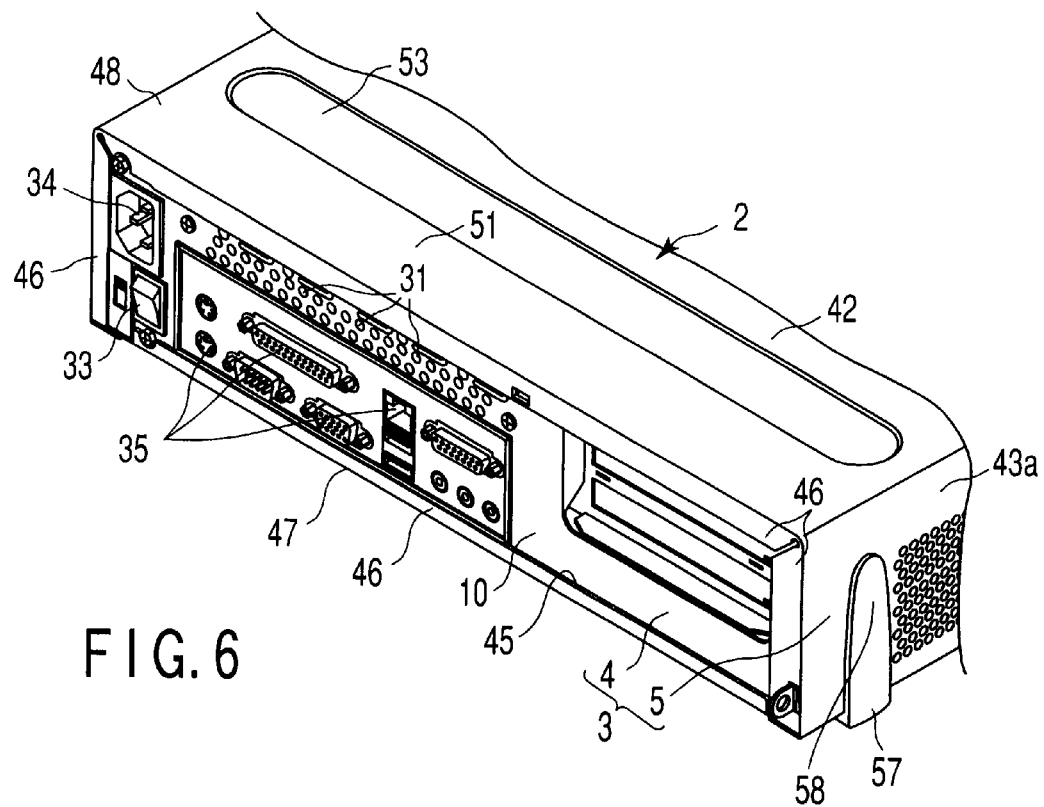
FIG. 6 is a perspective view of the rear end portion of the main body.

As shown in FIG. 6, the rear plate 10 of the frame 4 is provided with a power switch 33, power connector 34 and a plurality of connectors 35 for connecting various peripheral equipment, such as a printer. The connectors 35 are situated under the exhaust ports 31.

As shown in FIGS. 2 and 3, a decorative panel 37 of synthetic resin is attached to the front end of the frame 4. The panel 37 extends in the width direction of the frame 4 and frontally covers the front plate 9 of the frame 4. The panel 37 has first and second disk loading slots 38 and 39. The first disk loading slot 38 opens in a position corresponding to the floppy disk drive 17. The second disk loading slot 39 opens in a position corresponding to the CD-ROM drive 19.

Figure 5:
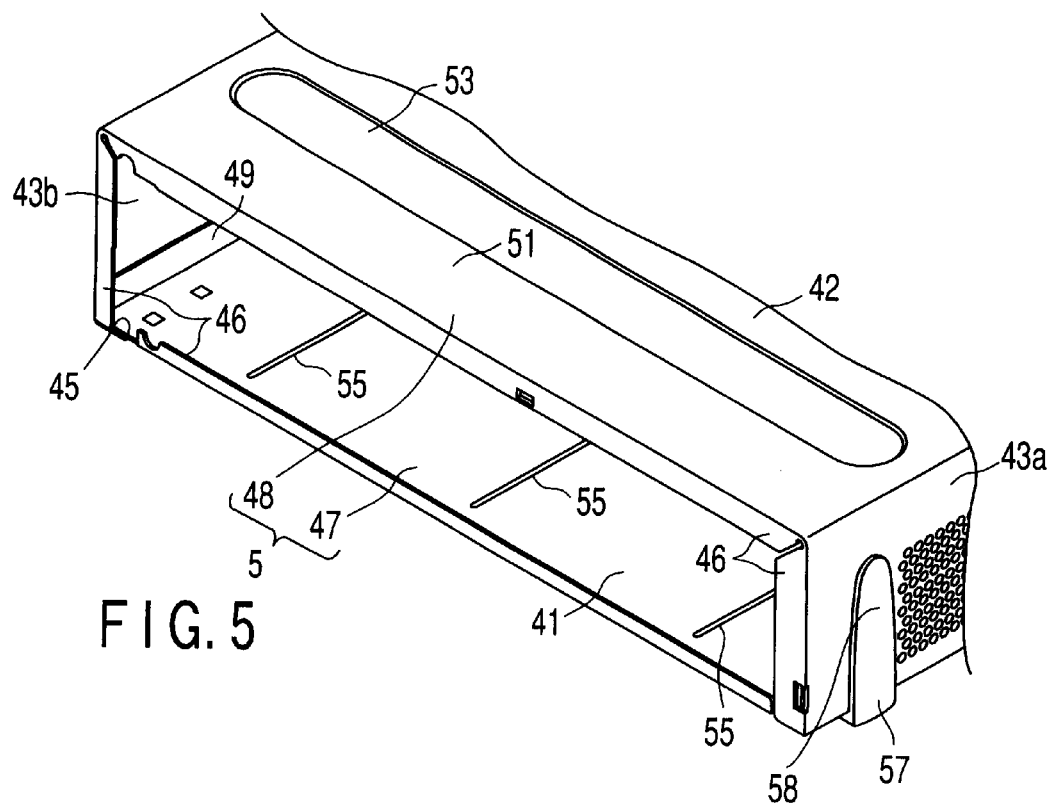
FIG. 5 is a perspective view of the rear end portion of the cover.

The cover 5 is formed of a pressed part of a steel plate with a thickness of about 1.5 mm, for example. The cover 5 includes a flat bottom plate 41, a top plate 42 opposed to the bottom plate 41, and a pair of upright plates 43a and 43b that extend between the respective left- and right-hand side edge portions of the bottom plate 41 and the top plate 42. The cover 5 is in the form of a hollow box that surrounds the frame 4 and opens in front and in the rear of the frame 4. Thus, the cover 5 has a first opening 44 at one end thereof through which the frame 4 is loaded and unloaded and a second opening 45 at the other end opposite from the first opening 44. As is best shown in FIG. 5, the cover 5 includes a flange-shaped stopper portion 46 that projects into the second opening 45. The stopper portion 46 extends covering the whole circumference of the second opening 45 and faces the first opening 44.

Figure 7:
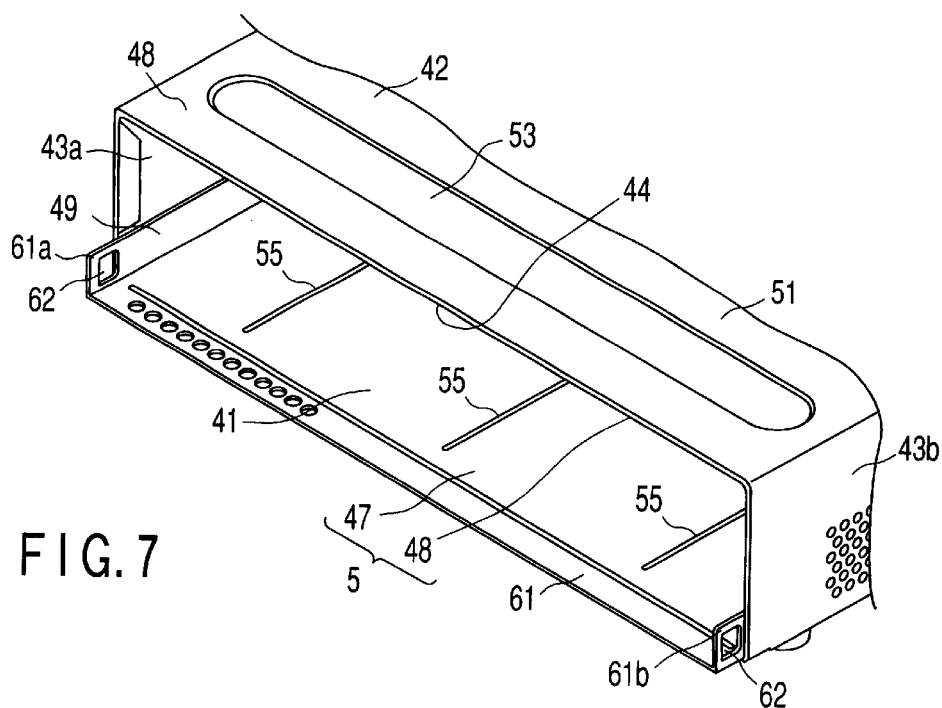
FIG. 7 is a perspective view of the front end portion of the cover.
Figure 8:
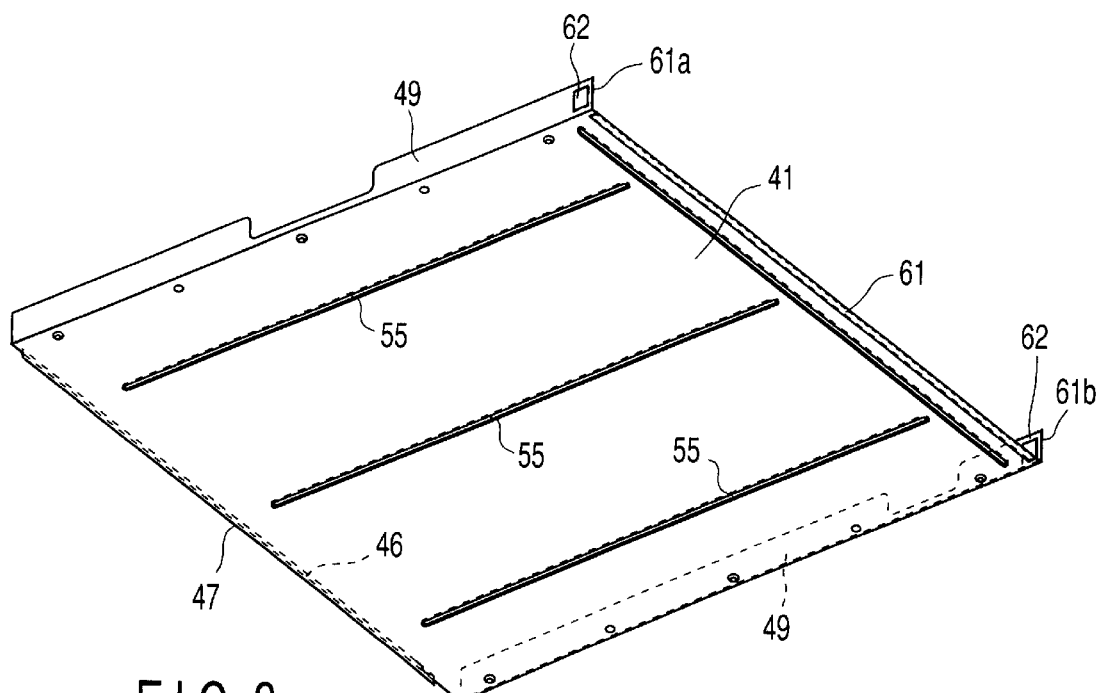
FIG. 8 is a perspective view of a lower panel.
Figure 9:
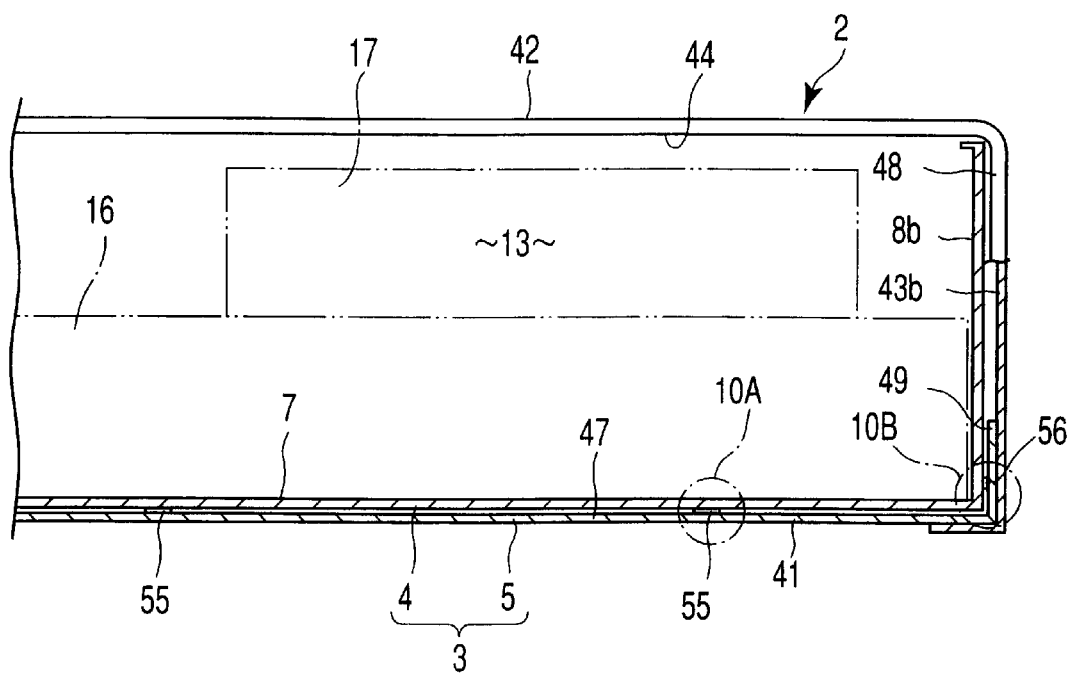
FIG. 9 is a sectional view of the main body with the frame held inside the cover.

As shown in FIGS. 7 to 9, the cover 5 is composed of a lower panel 47 and an upper panel 48. The lower panel 47 is in the form of a flat plate that includes the bottom plate 41. Upward flange portions 49 are formed individually on the left- and right-hand side edge portions of the lower panel 47. The flange portions 49 are bent at right angles to the panel 47. The upper panel 48 integrally includes the top plate 42 and the upright plates 43a and 43b. The respective lower end portions of the plates 43a and 43b are spot-welded to the respective outer side faces of their corresponding flange portions 49 of the lower panel 47. Thus, the cover 5 is a hollow box-shaped assembly that is a combination of the lower and upper panels 47 and 48.

The top plate 42 of the cover 5 has a horizontal bearing surface 51. The bearing surface 51 is used to carry thereon a heavy bulky article such as a CRT display device 52. The top plate 42 has a plurality of depressions 53 that extend in the width direction of the cover 5. The depressions 53, which serve to reinforce the top plate 42, are arranged at spaces in the depth direction of the plate 42.

Thus, the cover 5, the material of which has a properly set thickness, has a strength high enough to resist the weight of the CRT display device 52. Thus, the cover 5 can maintain the shape of a box even when the display device 52 is placed on the bearing surface 51 of the top plate 42.

Figure 10A:
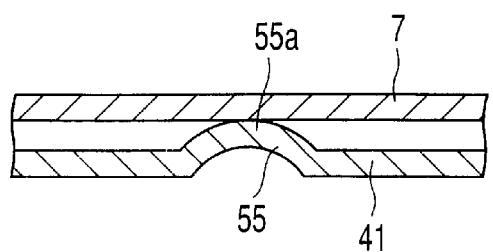
FIG. 10A is an enlarged sectional view showing a portion 10A of FIG. 9.

As shown in FIGS. 7 to 9, the bottom plate 41 of the cover 5 has a plurality of guide ribs 55 that project upward. The guide ribs 55 are formed by subjecting the bottom plate 41 to sheet metal stamping. As shown in FIG. 10A, each rib 55 has a top portion 55a that is curved in a circular arc. The guide ribs 55 extend straight from the first opening 44 of the cover 5 toward the second opening 45 and are arranged parallel to one another at spaces in the width direction of the cover 5.

Thus, if the frame 4 is inserted into the space inside the cover 5 through the first opening 44, the top portion 55a of each guide rib 55 slidably touches the lower surface of the bottom plate 7, thereby supporting the frame 4 from below.

Figure 10B:
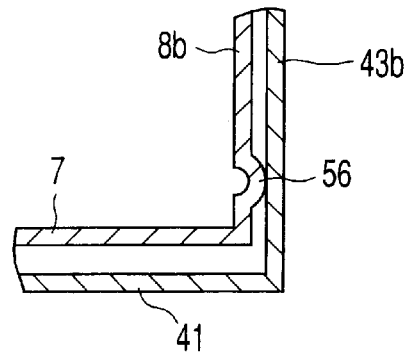
FIG. 10B is an enlarged sectional view showing a portion 10B of FIG. 9.

When the frame 4 is held inside the cover 5, its side plates 8a and 8b face the upright plates 43a and 43b of the cover 5, respectively. As shown in FIGS. 2 and 3, each of the side plates 8a and 8b of the frame 4 has a plurality of protrusions 56 on its lower end portion. The protrusions 56, which are formed by stamping the side plates 8a and 8b, are arranged in a line in the depth direction of the frame 4. As shown in FIG. 10B, the distal end of each protrusion 56 is slidably in contact with the inner surface of its corresponding upright plate 43a or 43b. This contact allows the frame 4 to be fitted tightly inside the cover 5, whereby the frame 4 is positioned in its width direction with respect to the cover 5.

If the frame 4 is inserted into the space inside the cover 5 through the first opening 44, the rear plate 10 of the frame 4 abuts against the stopper portion 46 of the cover 5, whereupon the frame 4 is restrained from being inserted further. In this state, the frame 4 is entirely concealed under the cover 5, and the power switch 33, power connector 34, and connectors 35 are exposed backwards through the second opening 45 of the main body 2. Thus, the power switch 33 can be accessed for on-off operation, and a power cable and cables of some peripheral equipments can be connected to the connectors 34 and 35.

When the rear plate 10 of the frame 4 abuts against the stopper portion 46, the decorative panel 37 of the frame 4 runs against the edge portion of the first opening 44 of the cover 5. Thus, the decorative panel 37 frontally conceals the first opening 44. At the same time, the flange portion 11 at the front end of the frame 4 sits under the front end portion of the top plate 42 so that the contacts 12 touch the lower surface of the top plate 42. Thereupon, the frame 4 touches the cover 5 via the rear plate 10 and the contacts 12, so that electrical conduction between the frame 4 and the cover 5 can be secured. In consequence, an electromagnetic shielding effect for the various function parts including the control circuit module 15 can be enhanced.

Figure 4:
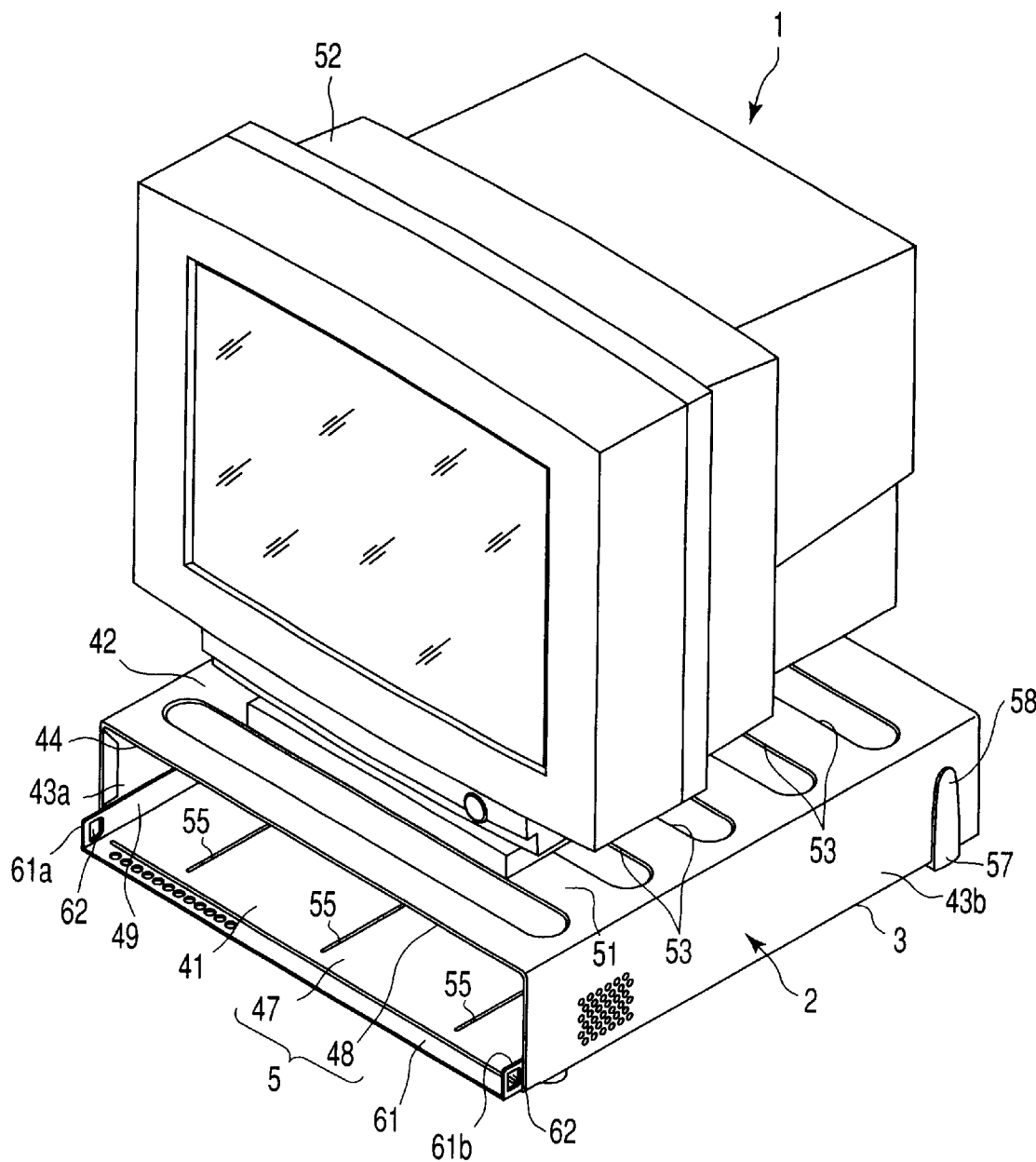
FIG. 4 is a perspective view of the desktop personal computer showing a state in which the cover is cleared of the frame.

As shown in FIGS. 4 and 7, the lower panel 47 has an extending portion 61 on its front end portion. The extending portion 61 projects forward from the first opening 44 of the cover 5. The extending portion 61 includes a first end portion 61a and a second end portion 61b. The first and second end portions 61a and 61b are bent upwards at right angles so as to be continuous with the flange portions 49, individually. They have their respective engaging holes 62. The first and second end portions 61a and 61b are adapted to be concealed under the decorative panel 37 when the panel 37 closes the first opening 44 of the cover 5.

As shown in FIGS. 4 to 6, the cover 5 is fitted with a pair of first leg portions 57 of synthetic resin. The first leg portions 57 are situated at corner parts that are defined by the bottom plate 41 and the upright plates 43a and 43b, individually. Each first leg portion 57 projects downward from the bottom plate 41 in a position adjacent to the second opening 45 of the cover 5. The first leg portions 57 have their respective decorative portions 58. The decorative portions 58 extend upward along their respective upright plates 43a and 43b and are exposed to the outside of the cover 5.

As shown in FIGS. 1 to 3, the decorative panel 37 of the frame 4 have left- and right-hand side faces 37a and 37b. The side faces 37a and 37b are situated just in front of the cover 5 and are continuous with the upright plates 43a and 43b of the cover 5 when the frame 4 is held entirely inside the cover 5.

The decorative panel 37 is fitted with a pair of second leg portions 59 of synthetic resin. The second leg portions 59 project downward from the respective lower ends of the side faces 37a and 37b of the panel 37. The second leg portions 59 have their respective decorative portions 60. The decorative portions 60, which have the same shape with the respective decorative portions 58 of the first leg portions 57, extend upward along their corresponding side faces 37a and 37b of the panel 37. Each decorative portion 60 has a plurality of clips 63 on its outer peripheral edge portion, as shown in FIG. 13.

As seen from FIG. 11, the decorative panel 37 has fitting holes 64 that open in its side faces 37a and 37b, individually. Each fitting hole 64 has an opening that corresponds to each decorative portion 60 in shape. The decorative portions 60 are fitted individually in the fitting holes 64, and the clips 63 are hooked on the respective open edge portions of the holes 64. Thus, the second leg portions 59 are supported on the decorative panel 37 by means of the decorative portions 60.

The frame 4 is provided with a pair of latch devices 66. The latch devices 66 are located individually on the left- and right-hand side portions of the front end of the frame 4. Since the latch devices 66 have the same configuration, only the latch device 66 on the right-hand side will now be described representatively.

As shown in FIGS. 11 to 13, the latch device 66 includes a latch piece 67 capable of being caught by each corresponding engaging hole 62 of the cover 5 and a release mechanism 68 for disengaging the latch piece 67 from the hole 62.

The latch piece 67 is formed of an elastically deformable synthetic resin material. The piece 67 includes a lever portion 69 that extends in the height direction of the front plate 9 of the frame 4. The upper end of the lever portion 69 is fixed to the front plate 9. Thus, the lower end of the lever portion 69 can be displaced in the width direction of the frame 4.

Figure 14:
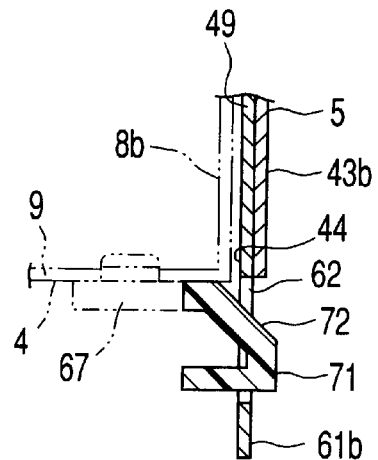
FIG. 14 is a sectional view of the latch device with the latch piece in its locking position.

A clip portion 71 is formed on the lower end portion of the lever portion 69. The clip portion 71 projects sideways from the side plate 8b of the frame 4. The clip portion 71 has a guide surface 72, as shown in FIG. 14. The guide surface 72 is inclined in a direction such that it gets closer the side plate 8b of the frame 4 as the rear part of the frame 4 is approached. The surface 72 is opposed to the respective front edge portions of the first and second end portions 61a and 61b of the extending portion 61 when the decorative panel 37 of the frame 4 approaches the first opening 44 of the cover 5.

The latch piece 67 can be elastically displaced between a locking position (shown in FIG. 14) in which the clip portion 71 is fitted in the engaging hole 62 and an unlocking position (shown in FIG. 15) in which the clip portion 71 is disengaged from the hole 62. Further, the latch piece 67 is normally urged toward the locking position by means of the natural elasticity of the lever portion 69.

The release mechanism 68 is incorporated in the decorative portion 60 of the second leg portion 59. More specifically, the decorative portion 60 has a recess 75, as seen from FIG. 13. The recess 75 has the shape of an ellipse that is elongated in the height direction of the decorative panel 37. First and second engaging holes 76a and 76b and a through hole 77 are formed in a bottom 75a of the recess 75. The first engaging hole 76a is situated at the upper end of the recess 75. The second engaging hole 76b is situated in the central portion of the recess 75. The through hole 77 is situated under the second engaging hole 76b.

The release mechanism 68 has a release button 78 of synthetic resin. The button 78 has an elliptic shape such that it can be fitted tight in the recess 75. The button 78 includes a first engaging claw 79a and a pair of second engaging claws 79b and 79c. The first engaging claw 79a is situated at one end of the button 78 and is hooked on the open edge portion of the first engaging hole 76a. The second engaging holes 79b and 79c are situated in the central portion of the button 78 and hooked on the open edge portion of the second engaging hole 76b. Thus, the release button 78 is combined integrally with the decorative portion 60 of the second leg portion 59, and the decorative portion 60 doubles as a holder for holding the button 78.

The release button 78 includes a guide protrusion 81 (shown in FIG. 11) and a push protrusion 82. The guide protrusion 81 is situated at the one end of the button 78, and its distal end abuts against the bottom 75a of the recess 75. The push protrusion 82 is inserted in the through hole 77 of the recess 75. Thus, the button 78 is supported on the decorative portion 60 for a rocking motion around the area of contact between the guide protrusion 81 and the bottom 75a in a direction such that the push protrusion 82 is pushed into or drawn out of the through hole 77.

The distal end of the push protrusion 82 faces the lever portion 69 of the latch piece 67. If the release button 78 is pushed into the recess 75 by fingertip, therefore, the lever portion 69 of the latch piece 67 is pressed by means of the push protrusion 82, as indicated by the arrow in FIG. 11. Thereupon, the latch piece 67 is displaced from the locking position toward the unlocking position.

The following is a description of the procedural steps for carrying out the maintenance of, for example, the interior of the main body 2 of the personal computer 1 constructed in this manner.

Unless the release button 78 is depressed, the latch piece 67 of the frame 4 is held in the locking position. As shown in FIG. 14, therefore, the clip portion 71 at the lower end of the latch piece 67 is caught by the engaging hole 62, so that the frame 4 is locked and prevented from being drawn out of the cover 5.

In drawing out the frame 4 from the cover 5, the power switch 33 is first tuned off, and the cables are disconnected from the power connector 34 and the connectors 35, individually.

Figure 15:
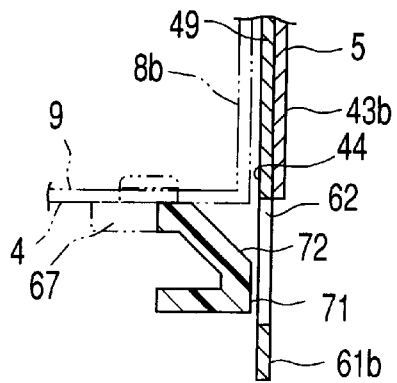
FIG. 15 is a sectional view of the latch device with the latch piece in its unlocking position.

Then, the release button 78 that is exposed through the side faces 37a and 37b of the decorative panel 37 is depressed with a fingertip. Thereupon, the push protrusion 82 of the button 78 advances toward the lever portion 69 of the latch piece 67, thereby displacing the latch piece 67 from the locking position to the unlocking position. Consequently, the clip portion 71 at the lower end of the lever portion 69 is disengaged from the engaging hole 62, so that the frame 4 is unlocked, as shown in FIG. 15.

Thus, the frame 4 can be drawn out through the first opening 44 of the cover 5 or removed from the cover 5. The various function parts, including the control circuit module 15 and the hard disk drive 18, are collectively supported on the frame 4. Accordingly, the function parts can be exposed to the outside of the housing 3 to facilitate various maintenance operations or expansion by simply drawing out the frame 4 from the cover 5.

Figure 16:
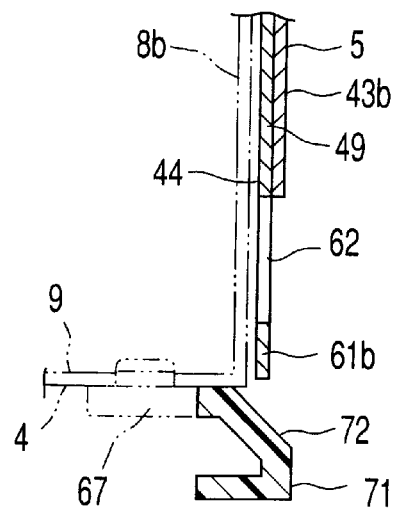
FIG. 16 is a sectional view of the latch device showing the positional relationship between a guide surface of the latch piece and the cover established when the frame is inserted into the space inside the cover.

In storing the control circuit module 15 and the function parts inside the cover 5, the frame 4 is inserted into the first opening 44 of the cover 5 with its rear plate 10 ahead. When the decorative panel 37 of the frame 4 reaches a position just short of the first opening 44, the first and second end portions 61a and 61b of the extending portion 61 face the clip portions 71 of the latch pieces 67, individually, as shown in FIG. 16. As the insertion of the frame 4 advances, the respective guide surfaces 72 of the clip portions 71 abut individually against the respective front ends of the first and second end portions 61a and 61b. Consequently, the clip portions 71 are pressed inside the side plates 8a and 8b, guided by the inclination of the guide surfaces 72. Thus, the latch piece 67 is automatically displaced from the locking position to the unlocking position, so that it never hinders the insertion of the frame 4.

When the rear plate 10 of the frame 4 abuts against the stopper portion 46 of the cover 5, the frame 4 is entirely held entire in the cover 5, and the decorative panel 37 of the frame 4 conceals the first opening 44 and the extending portion 61 of the cover 5. At the same time, the respective clip portions 71 of the latch pieces 67 get over the first and second end portions 61a and 61b of the cover 5, individually, and are aligned to their corresponding engaging holes 62. Thereupon, the latch pieces 67 are returned to the locking position by means of the elasticity of the lever portions 69, and the clip portions 71 engage the engaging holes 62, individually. Thus, the frame 4 is locked and prevented from being drawn out of the cover 5.

According to this personal computer 1, the frame 4 that support the various function parts, including the control circuit module 15 and the power unit 16, is held in the hollow box-shaped cover 5 so that it can be drawn out of the cover 5. Besides, the cover 5 has a strength high enough to resist the weight of the CRT display device 52 that is placed on the top plate 42.

Accordingly, the frame 4 can be drawn out through the first opening 44 of the cover 5 or taken out of the cover 5 without removing the CRT display device 52 from the top plate 42. Thus, the interior of the housing 3 can be quickly opened without requiring any troublesome preparatory arrangements, such as temporary transfer of the heavy bulky display device 52 to another place, to start the maintenance operation or the expansion of functions of the personal computer 1, for example.

Further, the installation of the CRT display device 52 does not require any dedicated space around the main body 2, so that there are no concerns about space.

Furthermore, the frame 4 is slidably supported by means of the bottom plate 41 and the upright plates 43a and 43b of the cover 5, and is guided in movement by them. Therefore, guiding the frame 4 requires no dedicated guide rails, and the construction of the housing 3 can be simplified although the frame 4 can be taken out of the cover 5. Thus, the manufacturing cost of the housing 3 can be lowered, so that a low-priced personal computer can be provided.

According to the arrangement described above, the bottom plate 41 of the cover 5 has the guide ribs 55, and the respective distal top portions 55a of the ribs 55 are in contact with the base plate 7 of the frame 4. Thus, the base plate 7 of the frame 4 and the bottom plate 41 of the cover 5 never rub in plane contact against each other, so that the area of contact between them can be reduced.

Likewise, the side plates 8a and 8b of the frame 4 have the projections 56 on their respective lower end portions, and the respective distal ends of the projections 56 are in contact with the upright plates 43a and 43b of the cover 5. Thus, the side plates 8a and 8b of the frame 4 and the upright plates 43a and 43b of the cover 5 never rub in plane contact against one another, so that the area of contact between them can be reduced.

In consequence, the sliding resistance that is produced when the frame 4 is loaded into or unloaded from the cover 5 can be lowered, so that the frame 4 can be smoothly loaded and unloaded with a small force.

Further, the frame 4 is provided with the latch devices 66. When the frame 4 is held entire inside the cover 5, therefore, the clip portion 71 of each latch piece 67 is caught by its corresponding engaging hole 62 of the cover 5. Thereupon, the frame 4 is locked so that it cannot slip out of the cover 5. Thus, the frame 4 can be prevented from being drawn out unexpectedly.

Drawing out the frame 4 from the cover 5 requires intentional operation such that the release button 78 of each release mechanism 68 is depressed with a fingertip to displace the latch piece 67 from the locking position to the unlocking position. Thus, an adverse operation can be prevented such that the frame 4 is drawn out of the cover 5 to allow the function parts including the control circuit module 15 to be exposed while the personal computer 1 is being used or when the power switch 33 is on.

According to the arrangement described above, moreover, the button 78 of each release mechanism 68 is incorporated in the decorative portion 60 of each second leg portion 59, so that the button 78 and the second leg portion 59 are designed as an integral part. Therefore, the release button 78 is not very conspicuous, so that the presence of the button 78 is not obvious from the external appearance. While the second leg portions 59 are attached to the decorative panel 37, moreover, the first leg portions 57 with the decorative portions 58 that have the same shape as the decorative portions 60 are attached to the cover 5. Thus, the decorative panel 37 and the cover 5 can enjoy a good affinity, so that the main body 2, also assisted by the inconspicuousness of the release button 78, can maintain a satisfactory external appearance.

According to the present invention, furthermore, the article that is placed on the top plate of the cover is not limited to a CRT display device, and may alternatively be peripheral equipment such as a printer or scanner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a box-shaped hollow cover including a bottom plate, a top plate, and a pair of upright plates extending between the bottom plate and the top plate, the cover having a first opening at one end and a second opening at another end, and the top plate having a plurality of depressions;
    a frame having a plurality of built-in function parts, the frame being slidably supported by the cover and being removably inserted into the cover through the first opening; and
    flange portions formed at an edge portion of the bottom plate, an edge portion of the top plate, and edge portions of the upright plates, and the flange portions projecting from the edge portion of each of the plates into the second opening.

2. An electronic apparatus according to claim 1, wherein the frame includes a latch device adapted to be releasably caught by the cover when the frame is held inside the cover, the latch device includes a latch piece, capable of being displaced between a locking position in which the latch piece is caught by the cover and an unlocking position in which the latch piece is disengaged from the cover and urged toward the locking position, and a release button for pressing the latch piece toward the unlocking position.

3. An electronic apparatus according to claim 2, wherein the frame includes a decorative panel adapted to close the first opening when the frame is held inside the cover, the latch piece is covered by the decorative panel, and the release button is incorporated in the decorative panel.

4. An electronic apparatus according to claim 1, wherein the flange portions abut against the frame to regulate positions of the cover and the frame when the frame is inserted into the cover through the first opening.

5. An electronic apparatus according to claim 1, wherein the frame includes a base plate overlapping the bottom plate and a pair of side plates rising from an edge portion of the base plate and overlapping the upright plates, and the function parts are located in a region surrounded by the base plate and the side plates.

6. An electronic apparatus according to claim 1, wherein the frame supports a plurality of connectors, and the connectors are exposed outside of the cover through the second opening when the frame is inside the cover.

7. An electronic apparatus comprising:
a box-shaped hollow cover including a bottom plate, a top plate, and a pair of upright plates extending between the bottom plate and the top plate, and the cover having a first opening at one end and a second opening at another end, and the top plate having a plurality of depressions;
a frame having a plurality of built-in function parts, the frame being slidably supported by the cover, and being removably inserted into the cover through the first opening; and
flange portions formed at an edge portion of the bottom plate, an edge of the top plate, and edge portions of the upright plates, and the flange portions projecting from the edge portion of each of the plates into the second opening;
a pair of latch pieces supported by the frame, the latch pieces being movable between a locking position in which the latch pieces are caught by one end of the cover and an unlocking position in which the latch pieces are disengaged from the one end of the cover, and being urged toward the locking position;
a panel supported by the frame, the panel covering the latch pieces, and closing the first opening of the cover when the frame is inside the cover; and
release buttons which are supported by the panel, the release buttons pressing the latch pieces from the locking position toward the unlocking position.

8. An electronic apparatus according to claim 7, wherein the flange portions abut against the frame to regulate the positions of the cover and the frame when the frame is inserted into the cover through the first opening.

9. An electronic apparatus according to claim 7, wherein the panel has side faces that extend along the upright plates of the cover when the frame is inside the cover, and the release buttons are placed on each of the side faces.

10. An electronic apparatus according to claim 7, wherein the frame supports a plurality of connectors, and the connectors are exposed outside of the cover through the second opening when the frame is inside the cover.

11. An electronic apparatus comprising:
a box-shaped hollow cover made of a steel sheet, the cover including a first opening at one end, a second opening at another end, a bottom plate, a reinforced top plate, a pair of upright plates extending between the bottom plate and the top plate, and a pair of first leg portions having decorative portions exposed along the upright plates;
a frame having a plurality of built-in function parts, the frame being slidably supported by the cover, and being removably inserted into the cover through the first opening, the frame including a panel having side faces, the panel closing the first opening when the frame is inside the cover, and the panel including a pair of second leg portions having decorative portions exposed along the side faces; and
a latch device for holding the frame inside the cover, the latch device being adapted to be releasably caught by the cover when the frame is held inside the cover.

12. An electronic apparatus according to claim 11, wherein said latch device includes a pair of latch pieces, supported on the frame so as to be displaced between a locking position in which the latch pieces are caught by the cover and an unlocking position in which the latch pieces are disengaged from the cover and urged toward the locking position, and release buttons for pressing the latch pieces toward the unlocking position, the release buttons being incorporated in the decorative portions of the second leg portions.

13. An electronic apparatus according to claim 11, wherein the top plate of the cover has a plurality of depressions for reinforcement, and flange portions are formed at an edge portion of the bottom plate, an edge portion of the top plate, and edge portions of the upright plates, and wherein the flange portions are projected from the edge portion of each of the plates into the second opening.

14. An electronic apparatus according to claim 13, wherein the flange portions abut against the frame to regulate the positions of the cover and the frame when the frame is inserted into the cover through the first opening.

15. An electronic apparatus comprising:
an external device;
a main body including a plurality of function parts built-in, the main body comprising a box-shaped hollow cover formed of a steel sheet, and a frame held inside the cover, which is to be drawn out of the cover and which supports the function parts, the cover including a top plate on which the external device is placed and a plurality of depressions are formed for reinforcement, and the cover having strength such that the cover maintains the shape of a box even when the external device is placed on the top plate; and
a latch device for holding the frame inside the cover, the latch device including a latch piece, capable of being displaced between a locking position in which the latch piece is caught by the cover and an unlocking position in which the latch piece is disengaged from the cover and urged toward the locking position, and a release button for pressing the latch piece toward the unlocking position.

16. An electronic apparatus according to claim 15, wherein said cover includes a bottom plate opposed to the top plate and a pair of upright plates extending between the bottom plate and the top plate, said frame includes a base plate overlapping the bottom plate and a pair of side plates rising from an edge portion of the base plate and overlapping the upright plates, and said function parts are located in a region surrounded by the base plate and the side plates.

17. An electronic apparatus according to claim 15, wherein said cover has an opening at one end thereof through which the frame is loaded and unloaded and a stopper portion at the other end opposite from the opening, the stopper portion being adapted to abut against the frame to regulate the respective positions of the cover and the frame when the frame is inserted into space inside the cover through the opening.

18. An electronic apparatus comprising:
a main body including a plurality of function parts built-in, the main body comprising a box-shaped hollow cover including a first opening at one end and a second opening at another end, and the main body including a frame which is held inside the cover, which is to be drawn out of the cover through the first opening, and which supports the function parts,
wherein the cover includes a bottom plate having a plurality of guide ribs extending linearly in the pullout direction of the frame, a top plate on which an article is placed, and a pair of upright plates extending between the bottom plate and the top plate, and the cover has strength such that the cover maintains the shape of a box even when the article is placed on the top plate, and wherein the frame supports at least one connector exposed outside of the cover through the second opening, and the frame includes a base plate overlapping the bottom plate and slidably in contact with the guide ribs and a pair of side plates including a plurality of protrusions which protrude from the base plate, overlap with the upright plates, and are in slidable contact with the upright plates.

19. An electronic apparatus according to claim 18, wherein said cover includes a stopper portion at the another end thereof facing the second opening, the stopper portion being adapted to abut against the frame to regulate the respective positions of the cover and the frame when the frame is inserted into the space inside the cover through the first opening.

* * * * *

UNITED STATES PATENT AND TRADEMARK OFFICE
CERTIFICATE OF CORRECTION

PATENT NO.    : 6,741,459 B2
DATED         : May 25, 2004
INVENTOR(S)   : Imamura It is certified that error appears in the above-identified patent and that said Letters Patent is hereby corrected as shown below:

<u>Title page,</u>
Item [*] Notice, please change to -- Subject to any disclaimer, the term of this patent is extended or adjusted under 35 U.S.C. 154(b) by 0 days. --

Signed and Sealed this

Twenty-first Day of June, 2005

JON W. DUDAS
*Director of the United States Patent and Trademark Office*